US010430270B2

(12) United States Patent
Chowdhury

(10) Patent No.: US 10,430,270 B2
(45) Date of Patent: Oct. 1, 2019

(54) SYSTEM FOR MIGRATING DATA USING DYNAMIC FEEDBACK

(71) Applicant: Bank of America Corporation, Charlotte, NC (US)

(72) Inventor: Sanjib Kumar Chowdhury, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 106 days.

(21) Appl. No.: 15/831,055

(22) Filed: Dec. 4, 2017

(65) Prior Publication Data

US 2019/0171514 A1    Jun. 6, 2019

(51) Int. Cl.
*G06F 11/00* (2006.01)
*G06F 11/07* (2006.01)
*G06F 3/06* (2006.01)

(52) U.S. Cl.
CPC ........ *G06F 11/0793* (2013.01); *G06F 3/0604* (2013.01); *G06F 3/064* (2013.01); *G06F 3/067* (2013.01); *G06F 3/0647* (2013.01); *G06F 11/0709* (2013.01); *G06F 11/079* (2013.01); *G06F 11/0727* (2013.01); *G06F 11/0751* (2013.01); *G06F 11/0787* (2013.01)

(58) Field of Classification Search
CPC .................................................. G06F 11/1402
USPC .......................................................... 714/16
See application file for complete search history.

(56) References Cited

U.S. PATENT DOCUMENTS

| | | | |
|---|---|---|---|
| 5,680,640 | A | 10/1997 | Ofek et al. |
| 5,758,083 | A | 5/1998 | Singh et al. |
| 6,421,723 | B1 | 7/2002 | Tawil |
| 6,636,239 | B1 | 10/2003 | Arqui et al. |
| 6,640,278 | B1 | 10/2003 | Nolan et al. |
| 6,654,830 | B1 | 11/2003 | Taylor et al. |
| 6,826,580 | B2 | 11/2004 | Harris et al. |
| 6,839,750 | B1 | 1/2005 | Bauer et al. |
| 6,947,939 | B2 | 9/2005 | Fujibayashi et al. |
| 6,950,871 | B1 | 9/2005 | Honma et al. |
| 7,007,048 | B1 | 2/2006 | Murray et al. |
| 7,328,260 | B1 | 2/2008 | Muthiyan et al. |
| 7,403,987 | B1 | 7/2008 | Marinelli et al. |
| 7,506,040 | B1 | 3/2009 | Rabe et al. |

(Continued)

*Primary Examiner* — Sarai E Butler
(74) *Attorney, Agent, or Firm* — Michael A. Springs; Moore & Van Allen PLLC; James C. Edwards

(57) ABSTRACT

The invention migrates data within a networked computing environment using dynamic feedback. Embodiments record, in a first database, dynamic implementation feedback data from an output of an adaptive decision engine, the dynamic implementation feedback data comprising data representing experience and impact of previously completed data migration projects; identify a first problem statement for data migration, the first problem statement comprising identification of data requiring migration; determine, based at least in part on the first problem statement, a first potential solution for data migration, the first potential solution comprising identification of a plurality of relevant systems and a plurality of process steps for using the plurality of systems to accomplish the data migration; determine a final solution based on the first potential solution; and determine, based on a calculated impact of the final solution, whether to implement the final solution.

20 Claims, 11 Drawing Sheets

(56) References Cited

U.S. PATENT DOCUMENTS

| | | | |
|---|---|---|---|
| 8,122,114 | B1 | 2/2012 | Krishnamoorthy et al. |
| 8,341,251 | B2 | 12/2012 | Gao et al. |
| 9,652,350 | B2 | 5/2017 | Astigarraga et al. |
| 2002/0059263 | A1 | 5/2002 | Shima et al. |
| 2002/0095602 | A1 | 7/2002 | Pherson et al. |
| 2002/0099914 | A1 | 7/2002 | Matsunami et al. |
| 2003/0055932 | A1 | 3/2003 | Brisse |
| 2003/0208589 | A1 | 11/2003 | Yamamoto |
| 2003/0236945 | A1 | 12/2003 | Nahum |
| 2008/0070509 | A1* | 3/2008 | Kish ............... H04B 17/0085 455/67.13 |
| 2009/0210417 | A1* | 8/2009 | Bennett ............... G06F 16/951 |
| 2015/0245084 | A1* | 8/2015 | Downing ........... G06F 16/2465 725/12 |
| 2015/0312340 | A1* | 10/2015 | Zhou ................ H04L 67/1095 709/217 |
| 2017/0178532 | A1* | 6/2017 | Lu ......................... G09B 5/00 |

* cited by examiner

SYSTEM FOR MIGRATING DATA USING DYNAMIC FEEDBACK

BACKGROUND

Present verification and execution of storage migration tasks in sequence is error prone, time consuming and highly dependent on human intelligence and experience.

BRIEF SUMMARY

Embodiments of the present invention address these and/or other needs by providing an innovative system directed to a system for migrating data within a networked computing environment using dynamic feedback, the system comprising at least one memory device; at least one network communication interface connected to a network; and at least one processing device operatively coupled to the memory device and the network communication interface, wherein the processing device is configured to execute computer-readable program code to: record, in a first database, dynamic implementation feedback data from an output of an adaptive decision engine, the dynamic implementation feedback data comprising data representing experience and impact of previously completed data migration projects; identify a first problem statement for data migration, the first problem statement c comprising identification of data requiring migration; determine, based at least in part on the first problem statement, a first potential solution for data migration, the first potential solution comprising identification of a plurality of relevant systems and a plurality of process steps for using the plurality of systems to accomplish the data migration, the determining comprising: accessing, by a first supportive decision engine and using the first database, the dynamic implementation feedback data; comparing at least one characteristic of the first problem statement to the dynamic implementation feedback data, thereby identifying at least one similar previous data migration project; and populating the first potential solution with identification of at least one relevant system and/or at least one process step utilized in the at least one similar previous data migration project. The processing device is also configured to execute computer-readable program code to determine a final solution based on the first potential solution; and determine, based on a calculated impact of the final solution, whether to implement the final solution.

In some embodiments, the processing device is further configured to execute computer-readable program code to determine whether to replace the first potential solution with a second potential solution, the determining comprising: accessing, by a second supportive decision engine, and using a second database comprising dynamic system configuration data and dynamic third party tool data, the dynamic system configuration data and the dynamic third party tool data; determining, using the dynamic system configuration data and dynamic third party tool data, whether implementation of the first potential solution would cause changes to the networked computing environment; if so, populating a second potential solution comprising identification of a plurality of relevant systems and a plurality of process steps for using the plurality of system to accomplish the data migration, thereby determining that the second potential solution is the final solution; and if not, determining that the first potential solution is the final solution.

In some such embodiments, the processing device is further configured to execute computer-readable program code to record, in the second database, the dynamic system configuration data and dynamic third party tool data.

In other such embodiments, the processing device is further configured to execute computer-readable program code to determine an impact of implementation of the final solution, the determining comprising: accessing, by a third supportive decision engine and using a third database, dynamic expert data; comparing at least one characteristic of the final solution to the dynamic expert data, thereby identifying at least one similar previous solution; and calculating, based on the comparison, an impact of implementing the final solution. In some of these embodiments, the processing device is further configured to execute computer-readable program code to compare, using the adaptive decision engine, the impact to a predetermined threshold; and perform engine final processing of the final solution, the performing comprising: if the impact is greater than the threshold, escalate the final solution and the impact to an administrative system for evaluation; and if the impact is less than the threshold, automatically implement the final solution. In some such embodiments, the processing device is further configured to execute computer-readable program code to output, by the adaptive decision engine and based on the performing engine final processing, the dynamic implementation feedback data from an output of an adaptive decision engine; and wherein the recording the dynamic implementation feedback data from an output of an adaptive decision engine comprises receiving the dynamic implementation feedback data from an output of an adaptive decision engine at the first database.

In some embodiments, the processing device is further configured to execute computer-readable program code to generate, by the adaptive decision engine, the first problem statement based on one or more system logs.

According to embodiments of the invention, a computer program product for migrating data within a networked computing environment using dynamic feedback includes at least one non-transitory computer readable medium having computer-readable program code portions embodied therein, and the computer-readable program code portions comprise an executable portion configured for recording, in a first database, dynamic implementation feedback data from an output of an adaptive decision engine, the dynamic implementation feedback data comprising data representing experience and impact of previously completed data migration projects; an executable portion configured for identifying a first problem statement for data migration, the first problem statement c comprising identification of data requiring migration; an executable portion configured for determining, based at least in part on the first problem statement, a first potential solution for data migration, the first potential solution comprising identification of a plurality of relevant systems and a plurality of process steps for using the plurality of systems to accomplish the data migration, the determining comprising: an executable portion configured for accessing, by a first supportive decision engine and using the first database, the dynamic implementation feedback data; an executable portion configured for comparing at least one characteristic of the first problem statement to the dynamic implementation feedback data, thereby identifying at least one similar previous data migration project; and an executable portion configured for populating the first potential solution with identification of at least one relevant system and/or at least one process step utilized in the at least one similar previous data migration project; an executable portion configured for determining a final solution based on the first potential solution; and an executable portion configured for determining, based on a calculated impact of the final solution, whether to implement the final solution.

In some embodiments, the computer-readable program code portions further comprises an executable portion configured for determining whether to replace the first potential solution with a second potential solution, the determining comprising: accessing, by a second supportive decision engine, and using a second database comprising dynamic system configuration data and dynamic third party tool data, the dynamic system configuration data and the dynamic third party tool data; determining, using the dynamic system configuration data and dynamic third party tool data, whether implementation of the first potential solution would cause changes to the networked computing environment; if so, populating a second potential solution comprising identification of a plurality of relevant systems and a plurality of process steps for using the plurality of system to accomplish the data migration, thereby determining that the second potential solution is the final solution; and if not, determining that the first potential solution is the final solution.

In some such embodiments, the computer-readable program code portions further comprise: an executable portion configured for recording, in the second database, the dynamic system configuration data and dynamic third party tool data.

In other such embodiments, the computer-readable program code portions further comprise: an executable portion configured for determining an impact of implementation of the final solution, the determining comprising: accessing, by a third supportive decision engine and using a third database, dynamic expert data; comparing at least one characteristic of the final solution to the dynamic expert data, thereby identifying at least one similar previous solution; and calculating, based on the comparison, an impact of implementing the final solution.

In some such embodiments, the computer-readable program code portions further comprise: an executable portion configured for comparing, using the adaptive decision engine, the impact to a predetermined threshold; and an executable portion configured for performing engine final processing of the final solution, the performing comprising: if the impact is greater than the threshold, escalate the final solution and the impact to an administrative system for evaluation; and if the impact is less than the threshold, automatically implement the final solution. In some such embodiments, the computer-readable program code portions further comprise: an executable portion configured for outputting, by the adaptive decision engine and based on the performing engine final processing, the dynamic implementation feedback data from an output of an adaptive decision engine; and wherein the recording the dynamic implementation feedback data from an output of an adaptive decision engine comprises receiving the dynamic implementation feedback data from an output of an adaptive decision engine at the first database.

In some embodiments, the computer-readable program code portions further comprise: an executable portion configured for generating, by the adaptive decision engine, the first problem statement based on one or more system logs.

According to embodiments of the invention, a computer implemented method for migrating data within a networked computing environment using dynamic feedback includes recording, in a first database, dynamic implementation feedback data from an output of an adaptive decision engine, the dynamic implementation feedback data comprising data representing experience and impact of previously completed data migration projects; identifying a first problem statement for data migration, the first problem statement c comprising identification of data requiring migration; determining, based at least in part on the first problem statement, a first potential solution for data migration, the first potential solution comprising identification of a plurality of relevant systems and a plurality of process steps for using the plurality of systems to accomplish the data migration, the determining comprising accessing, by a first supportive decision engine and using the first database, the dynamic implementation feedback data; comparing at least one characteristic of the first problem statement to the dynamic implementation feedback data, thereby identifying at least one similar previous data migration project; and populating the first potential solution with identification of at least one relevant system and/or at least one process step utilized in the at least one similar previous data migration project; determining a final solution based on the first potential solution; and determining, based on a calculated impact of the final solution, whether to implement the final solution.

In some embodiments, the method includes determining whether to replace the first potential solution with a second potential solution, the determining comprising: accessing, by a second supportive decision engine, and using a second database comprising dynamic system configuration data and dynamic third party tool data, the dynamic system configuration data and the dynamic third party tool data; determining, using the dynamic system configuration data and dynamic third party tool data, whether implementation of the first potential solution would cause changes to the networked computing environment; if so, populating a second potential solution comprising identification of a plurality of relevant systems and a plurality of process steps for using the plurality of system to accomplish the data migration, thereby determining that the second potential solution is the final solution; and if not, determining that the first potential solution is the final solution.

In some of these embodiments, the method includes recording, in the second database, the dynamic system configuration data and dynamic third party tool data.

In some embodiments, the method includes determining an impact of implementation of the final solution, the determining comprises accessing, by a third supportive decision engine and using a third database, dynamic expert data; comparing at least one characteristic of the final solution to the dynamic expert data, thereby identifying at least one similar previous solution; and calculating, based on the comparison, an impact of implementing the final solution. In some such embodiments, the method includes comparing, using the adaptive decision engine, the impact to a predetermined threshold; and performing engine final processing of the final solution, the performing comprising: if the impact is greater than the threshold, escalate the final solution and the impact to an administrative system for evaluation; and if the impact is less than the threshold, automatically implement the final solution.

In some embodiments, the method includes outputting, by the adaptive decision engine and based on the performing engine final processing, the dynamic implementation feedback data from an output of an adaptive decision engine; and wherein the recording the dynamic implementation feedback data from an output of an adaptive decision engine comprises receiving the dynamic implementation feedback data from an output of an adaptive decision engine at the first database.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
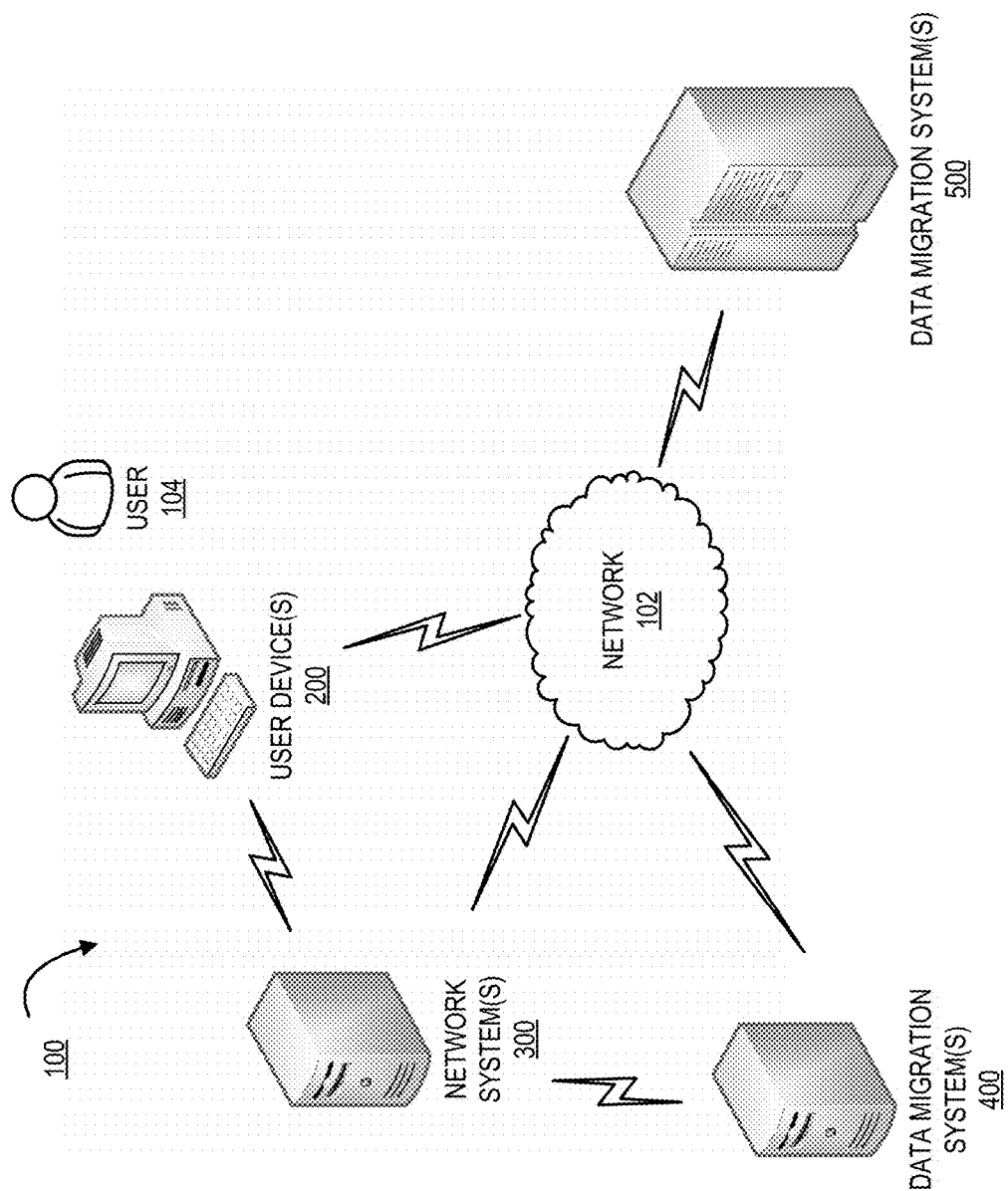
Figure 2:
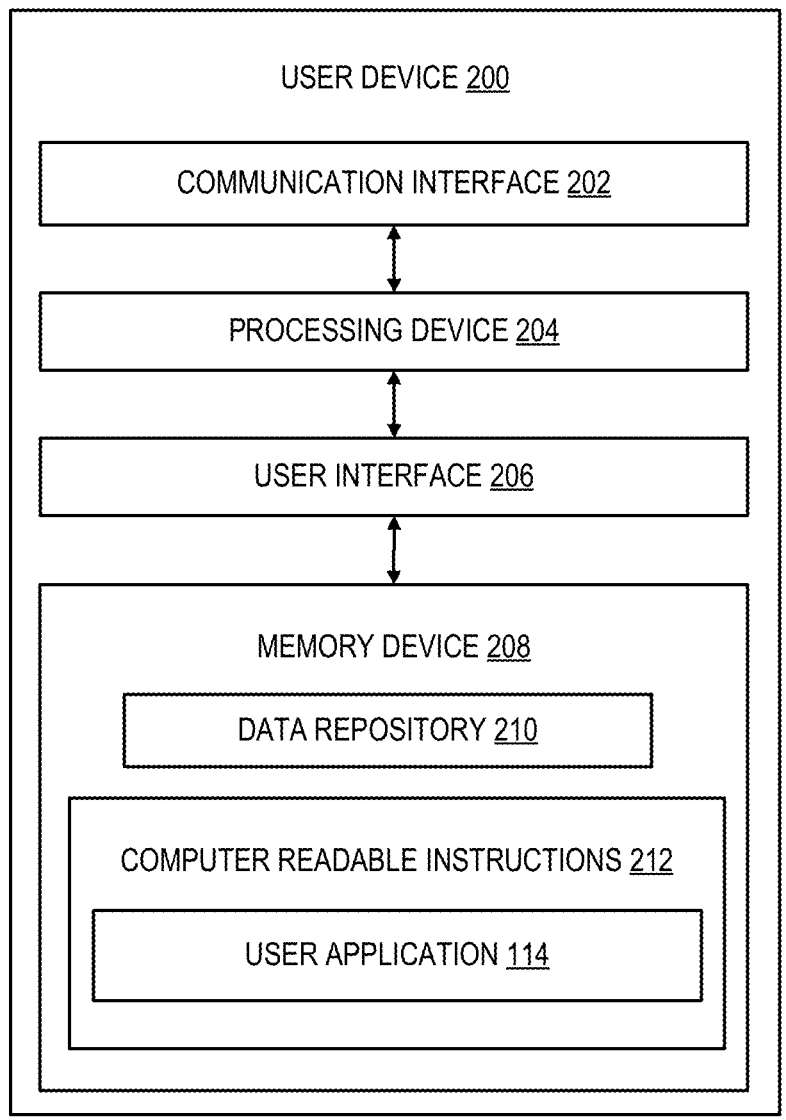
Figure 3:
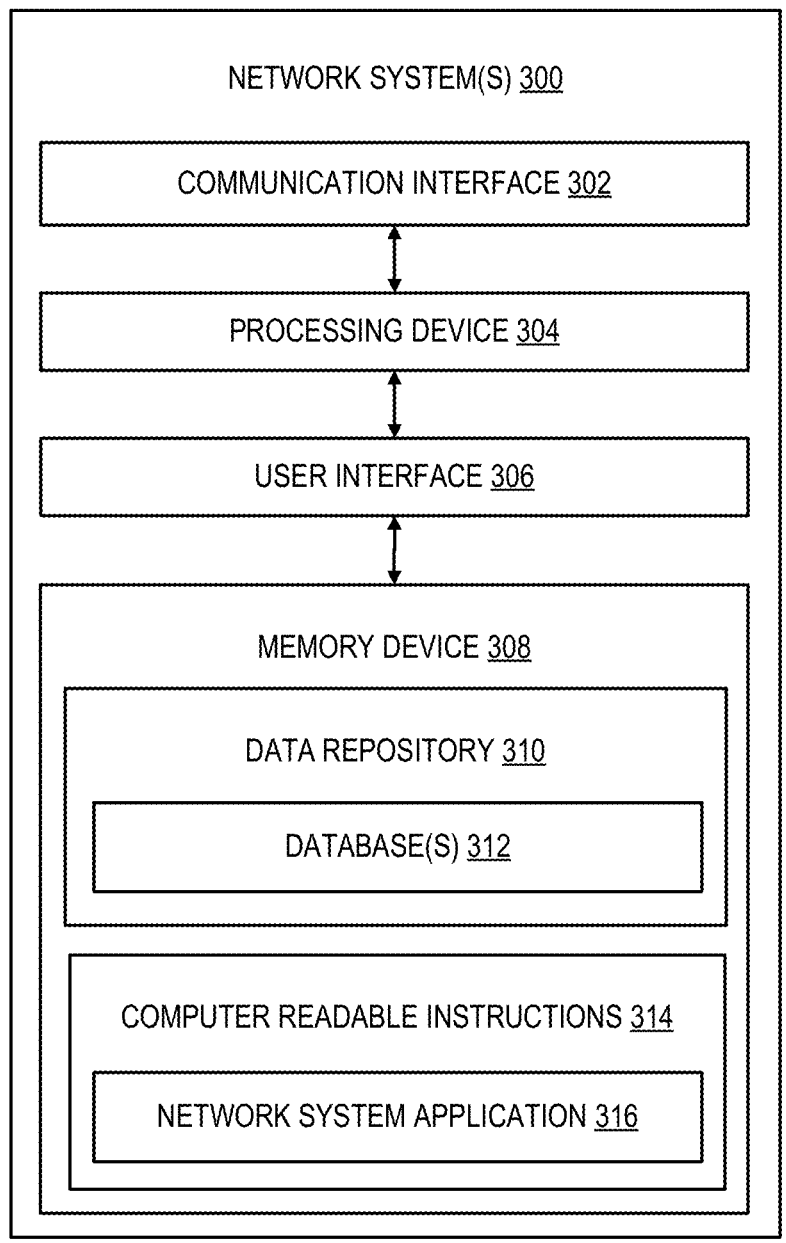
Figure 4:
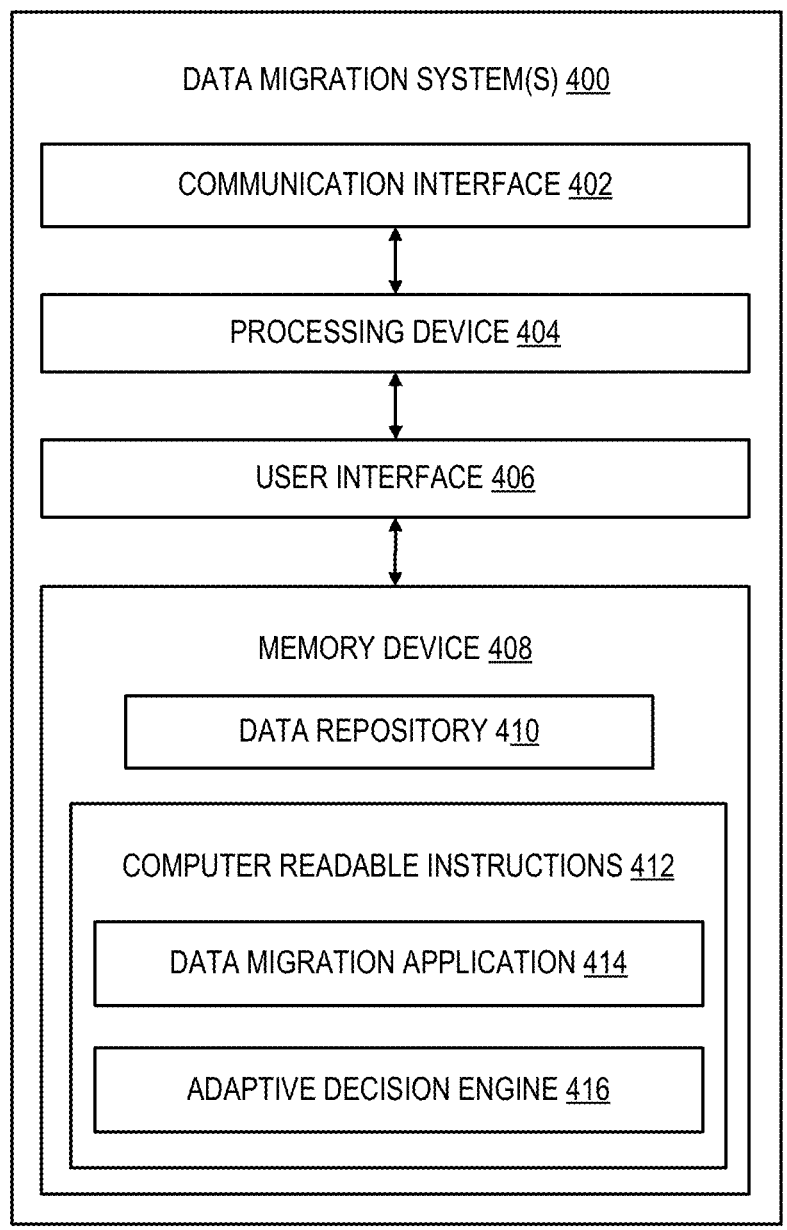
Figure 5:
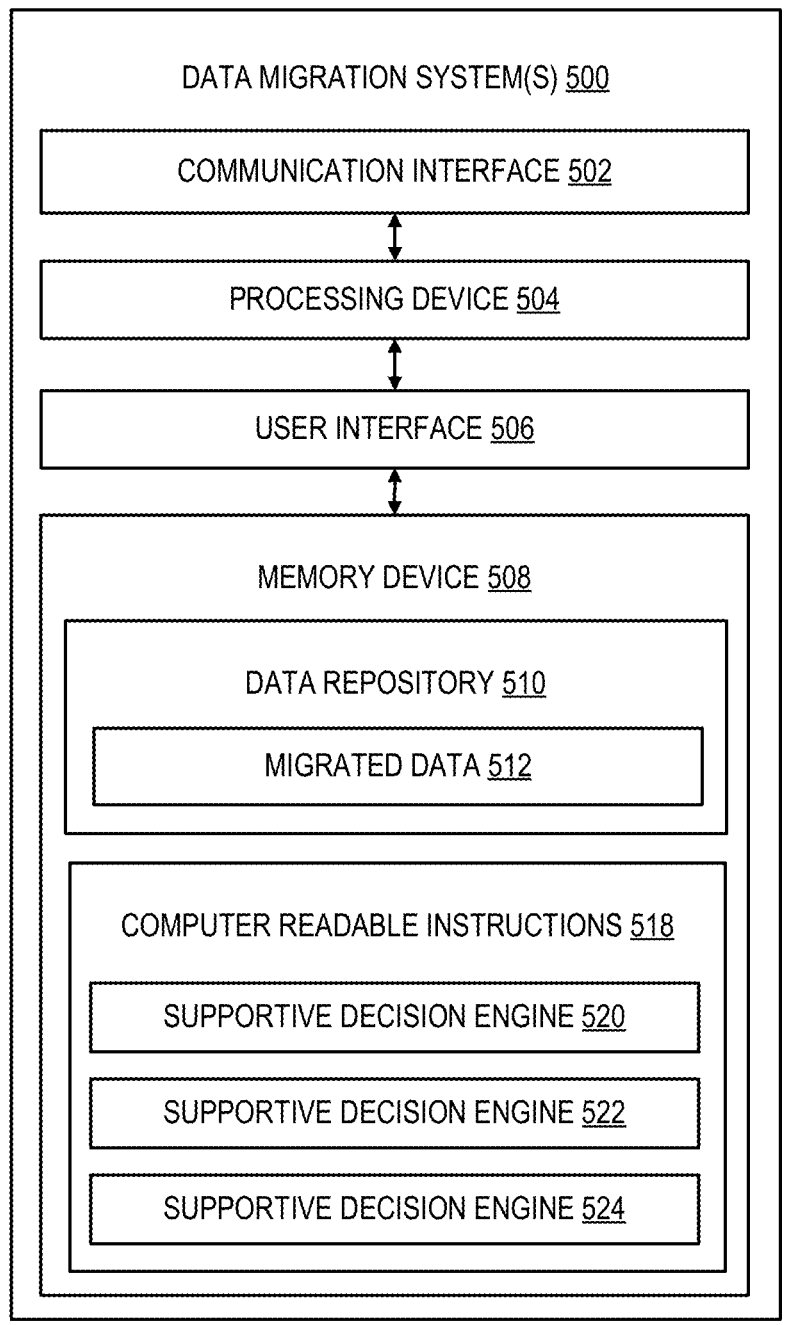
Figure 6:
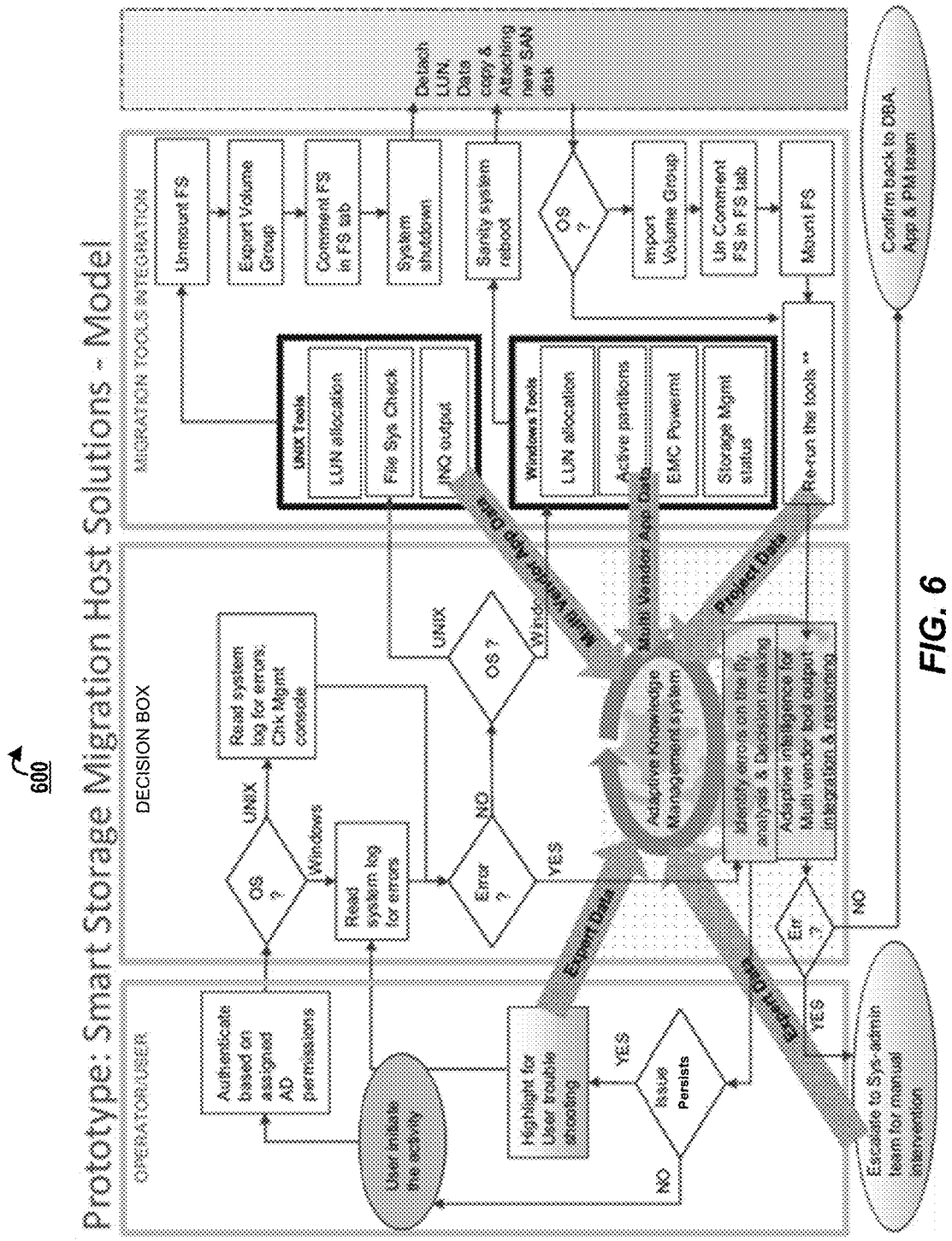
Figure 7:
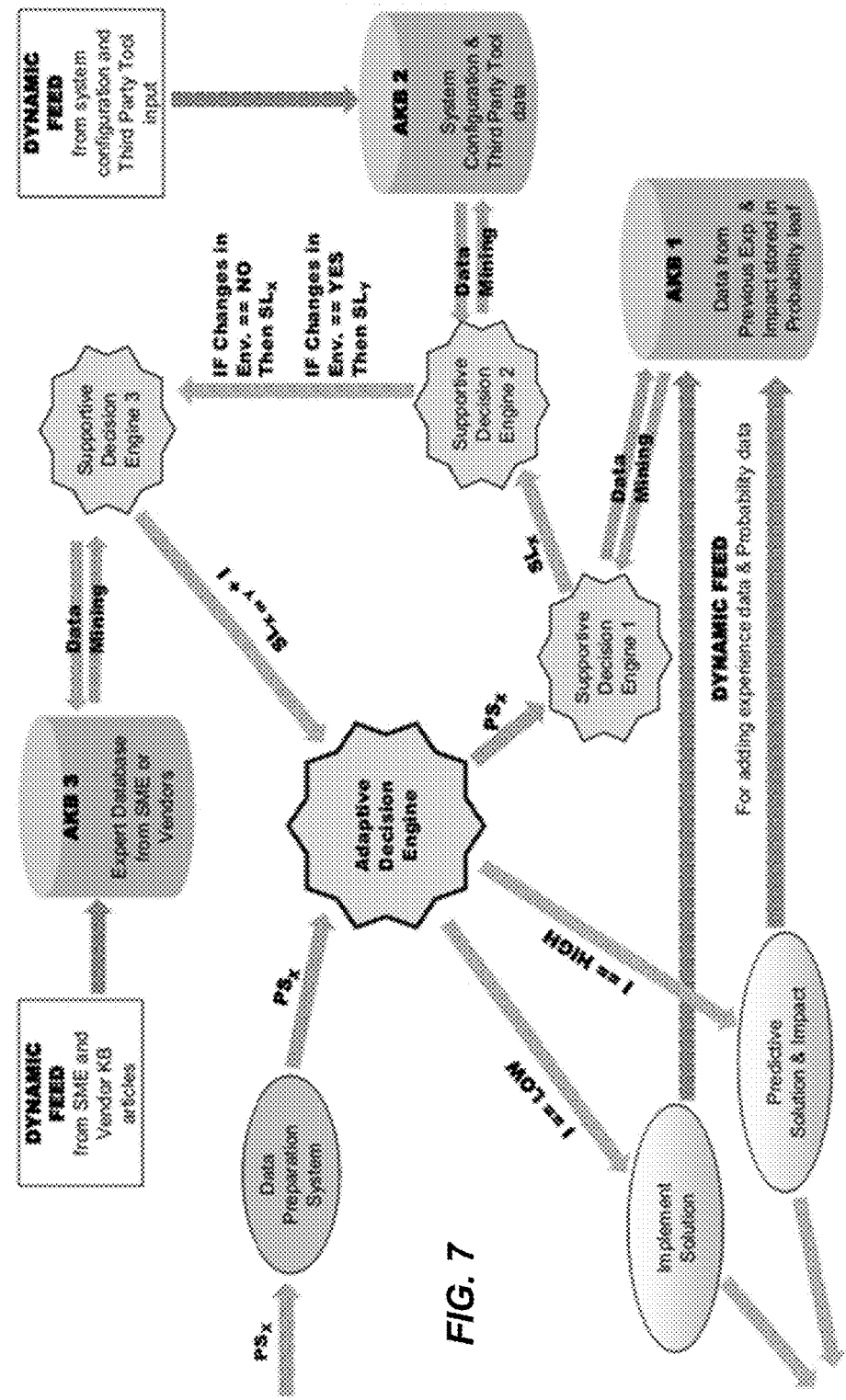
Figure 8:
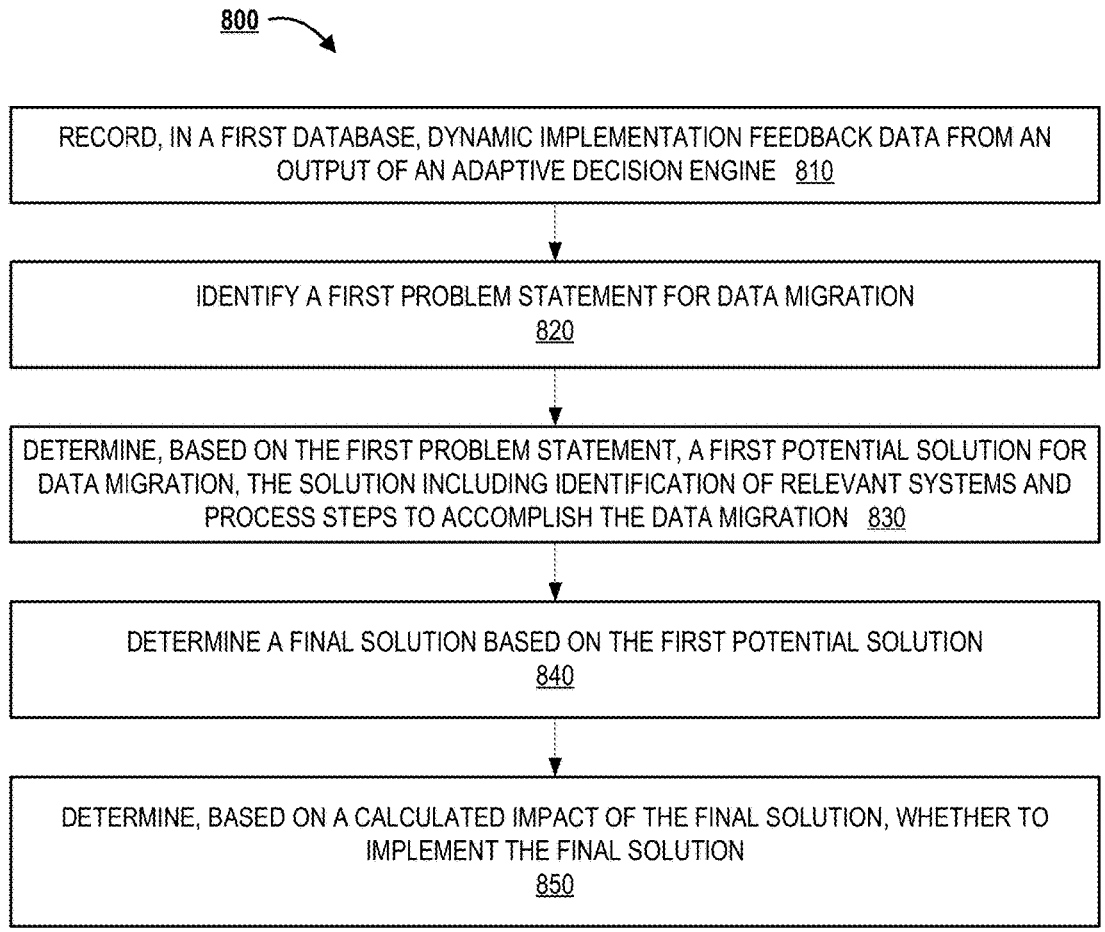
Figure 9:
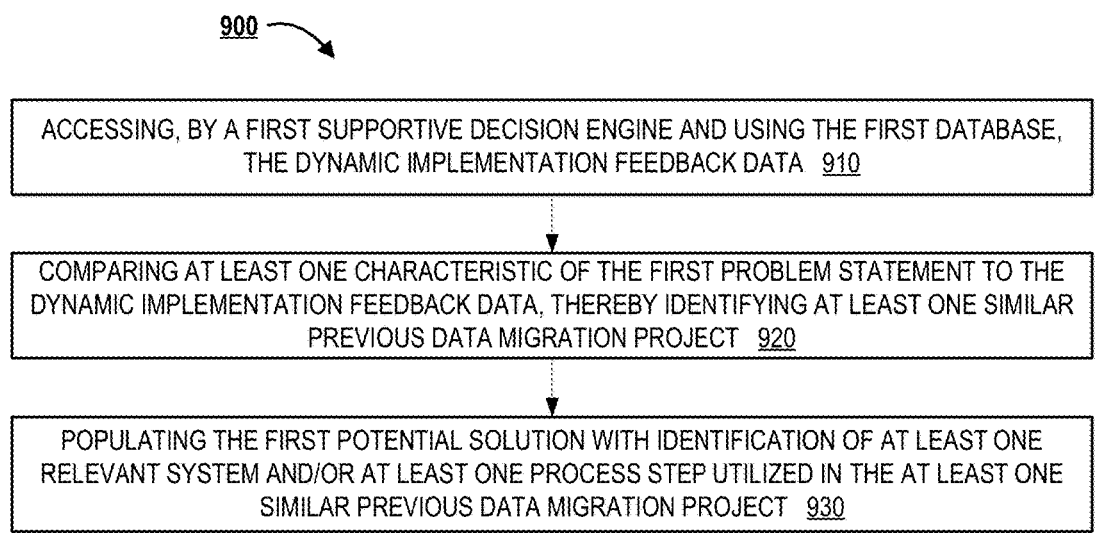
Figure 10:
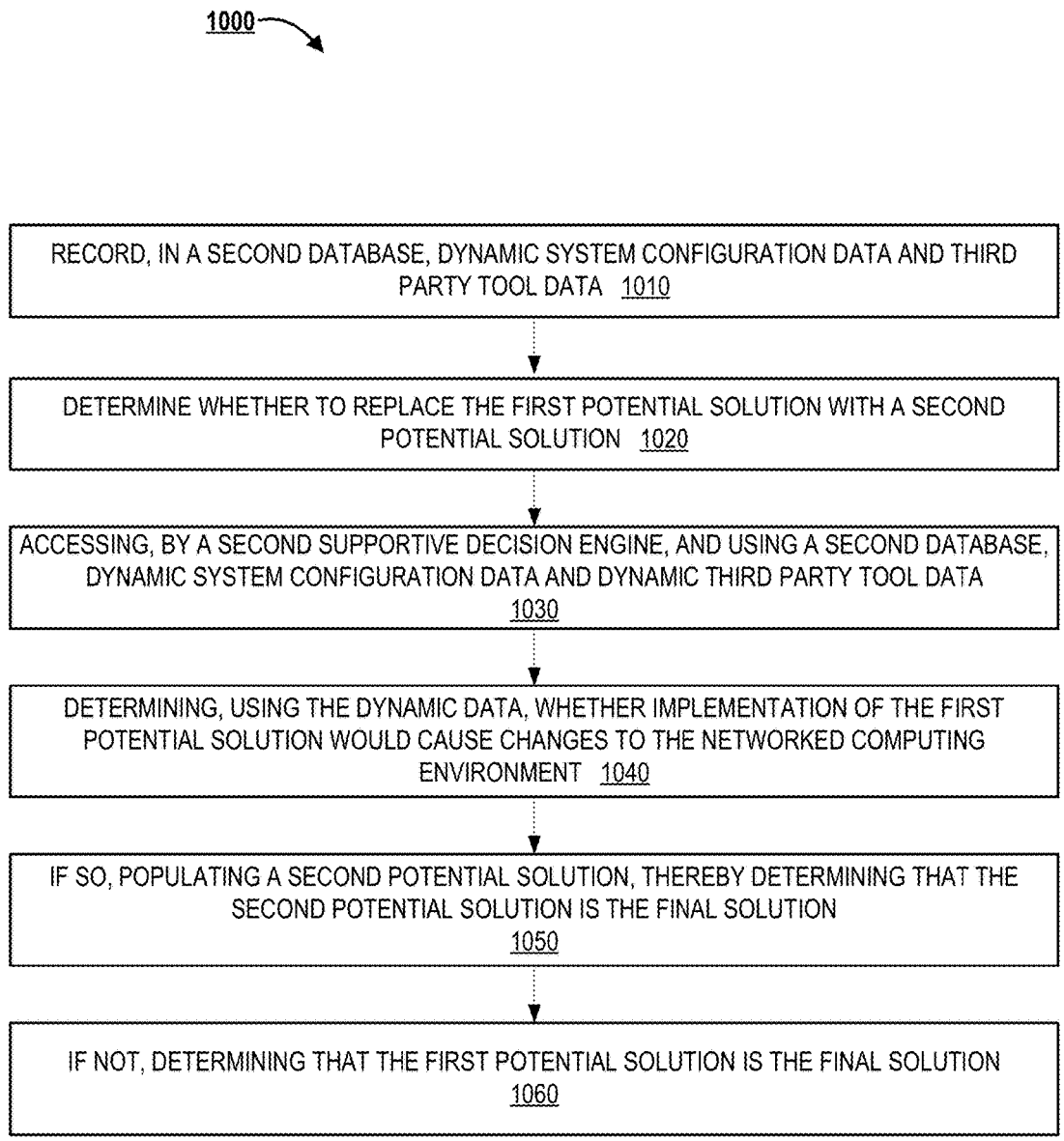
Figure 11:
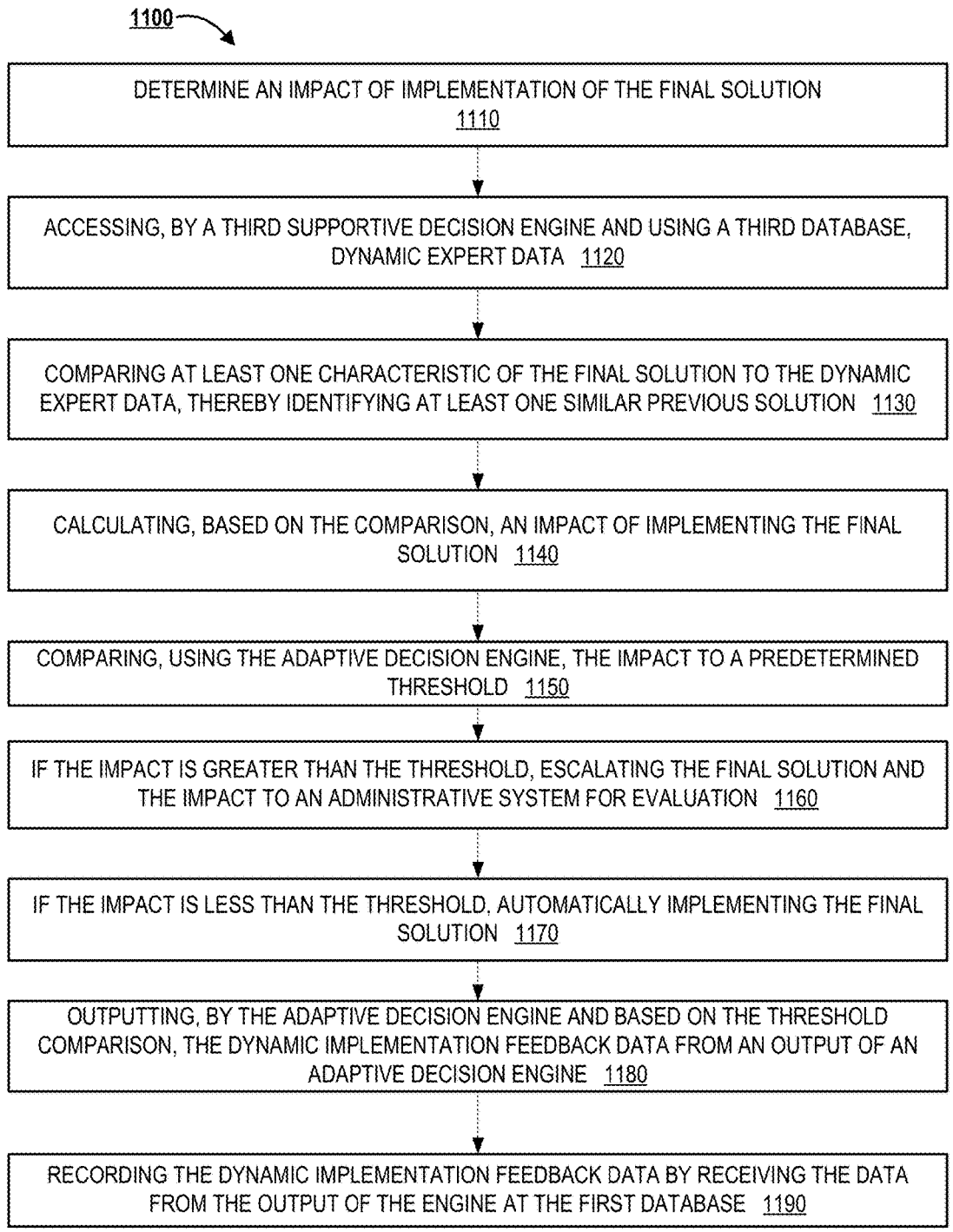

Having thus described embodiments of the invention in general terms, reference will now be made the accompanying drawings, wherein:

FIG. 1 illustrates a network system environment, in accordance with some embodiments of the invention;

FIG. 2 schematically depicts a user device, in accordance with some embodiments of the invention;

FIG. 3 schematically depicts network system(s), in accordance with some embodiments of the invention;

FIG. 4 schematically depicts a data migration system(s), in accordance with some embodiments of the invention;

FIG. 5 schematically depicts a data migration system(s), in accordance with some embodiments of the invention;

FIG. 6 provides a graphical representation of data migration through dynamic feedback, in accordance with some embodiments of the invention;

FIG. 7 provides a graphical representation of data migration through dynamic feedback, in accordance with some embodiments of the invention;

FIG. 8 provides a high level process flow for migrating data using dynamic feedback, in accordance with some embodiments of the invention;

FIG. 9 provides a high level process flow for migrating data using dynamic feedback, in accordance with some embodiments of the invention;

FIG. 10 provides a high level process flow for migrating data using dynamic feedback, in accordance with some embodiments of the invention; and FIG. 11 provides a high level process flow for migrating data using dynamic feedback, in accordance with some embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

"Authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. An "entity" as used herein may be a financial institution.

To "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information. To "maintain" or to provide "maintenance" is to manage, update, or retain something. In some embodiments "maintaining" may include housing or storing a database or server on hardware and/or software associated with a maintaining entity. In some embodiments, "maintaining" may further comprise applying software updates or applying patches to a server or database.

A "database" may be a collection of stored data, a data repository, an application, software, or the like. In some embodiments a database is a relational database. A "user" may be an operator of a server administration tool (e.g., a server administrator, database administrator, technician, analyst, software developer or the like). Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, gaming devices, laptop computers, cameras, video recorders, audio/video player, radio, global positioning system (GPS) devices, or any combination of the aforementioned. In accordance with embodiments of the invention, the term "entity" includes any organization that maintains, operates, and/or stores information or data on one or more databases, servers, and/or server systems. In some embodiments, a "user" and "entity" may refer to the same person.

There is an absence of systematic tools to simplify, analyze, integrate, troubleshoot, authenticate and execute Storage Area Network (SAN) storage migration host related tasks. The current manual verification and execution of tasks in sequence is error prone, time consuming and highly dependent on human intelligence and experience quotient.

The present model of individual tools for execution and output verification are based on the existing knowledge base and is stagnant in nature. Further, it is prone to misevaluation of the error impact complexity. Additionally, the current static solution will not meet the business dynamics and subsequent module integration or disintegration necessities in the long run.

Accordingly, embodiments of the invention provide a system that functions to use criteria based on error evaluation, troubleshoot based on artificial intelligence, integrate multiple vendor tools, measure and analyze errors based in a multicast environment using a proprietary algorithm, and integrate and disintegrate tools and modules.

Various features of the innovative tool provide aspects unique to the industry, including without limitation, that the innovative tool is built for identifying errors on the fly and evaluating with multiple scenarios as options, the tool sequences, integrates and executes multiple vendor tool by modifying its operating environment, analyzes errors based on the output integration from various vendor tools, and gauges effectiveness and suggests, based on historical server log and/or alerts from individual systems in the SAN.

FIG. 5 shows a smart storage migration host solutions model according to an embodiment of the invention.

FIG. 6 shows a smart storage migration host solution illustration according to an embodiment of the invention.

As shown in FIG. 5, an operator/user initiates an activity and the user is authenticated based on assigned administrator permissions. Then, the decision box, which represents the adaptive knowledge management system determines which operating system is present in the identified system, and depending on which operating system is present, the system reads appropriate system logs for errors and checks the management console in the case of a UNIX operating system. If there are no errors, then, depending on the operating system, the system leverages a number of OS-specific tools such as a LUN allocation, a file system check and an INQ output in the case of a UNIX OS, and a LUN allocation, active partitions, EMC "powermt" and storage management status in the case of a Windows OS.

In the case of a UNIX OS, the file system (FS) is unmounted, the volume group is exported, the FS comment is inserted in the FS tab, and the system is shutdown. In the case of a Windows OS, the system is rebooted in a "sanity reboot". Then, the LUN is detached, the data is copied and a new SAN disk is attached. After the new disk is attached, the OS is checked again, and in the case of UNIX, the volume group is imported, the FS comment is removed from FS tab and the FS is mounted. The various tools may then be re-run for either UNIX or Windows-based systems.

Feedback is provided to the adaptive knowledge management system from the migration tool integration. The adaptive intelligence provides multiple vendor tool output integration and reasoning. The adaptive knowledge management system (AKMS) may receive as inputs multiple vendor application data and project data, as well as expert data from different sources.

Errors may be checked again and if no errors are present, then the system may confirm to interested parties, such as the application team that no errors are present. If errors are detected at that stage, then the errors may be escalated to a system administrator team for manual intervention.

In a case where an error is detected after the system logs are read for errors, then the process flows moves to the AKMS for identifying the errors on the fly and performing analysis and decision making based on various expert data, multiple vendor application data and project data that have been inputted to the AKM, not only for the present data migration project but from other data migration projects.

Referring now to FIG. 6, a smart storage migration host solutions illustration is shown. The adaptive decision engine (ADE), which in some embodiments is the same as the AKMS discussed above, takes in a problem statement PSx from a data preparation system. It then sends PSx to a Supportive Decision Engine 1 (SDE1). The SDE1 also receives input ("data mining") from the Application Knowledge Base 1 (AKB1), which stores data from previous experience and impacts. This data may be stored in a probability leaf configuration. Notably, the AKB1 may receive overall system dynamic feedback from the ADE in the form of data related to formerly implemented solutions and/or predictive solutions and the impacts of implemented solutions. Such dynamic feedback is a source for the data stored in the AKB1. In essence, the AKB1 includes data related to the previous history of solutions and their impacts.

The SDE1 uses that information to analyze the PSx to formulate a solution (SLx). The SDE1 then transmits the SLx to the Supportive Decision Engine 2 (SDE2). The SDE2 receives input (data mining) from the Application Knowledge Base 2 (AKB2), which includes system configuration and third party tool data. This data may be based on dynamic feedback from the system configuration and third party tools. In essence, the AKB2 includes data related to the overall system configuration information and the SDE2. The SDE2 determines whether there are any changes in the system environment. If so, then the SDE2 formulates a new solution Sly. If SDE2 determines that there are no changes to the system environment, then it retains the original solution generated by SDE1, which was SLx. These determinations are based on the history of the system and a determined probability that changes to the environment have been or will be necessary upon implementation of the proposed solution SLx.

Then, Supportive Decision Engine 3 (SDE3) receives input (data mining) from Application Knowledge Base 3 (AKB3), which includes expert information. The AKB3 database may be sourced from a dynamic feed of Subject Matter Experts (SME data) and Vendor Knowledge Base (KB) articles. SDE3 re-evaluates the solution received from SDE2, which is SL(x or y) and adds the potential impact information (I), which, in some embodiments includes or constitutes probability information. This probability information may be or include information regarding the probability of one or more results occurring such as the probability of one or more error(s) occurring. Then, the SDE3 transmits SL(x or y)+I. Hence, SDE3 does not necessarily consider whether to change (nor does it implement a change) to the solution proposed by SDE2, but rather, SDE3 analyzes the proposed solution for its impact and adds the impact information to the dataset or information it transmits to the Adaptive Decision Engine. When the ADE receives the [SL(x or y)+I] transmission, it analyzes whether the SDE3 calculated impact is high or low based on predetermined thresholds.

If the impact I is low, then the solution is implemented. If the impact is high, then the predictive solution and impact may be escalated for further consideration by a system administrator.

In this regard, the impact may constitute a scaled score, such as a score between one (1) and ten (10), where one is low and ten is high. The system may include a threshold level for escalating to system administration for consideration. For example, in one implementation, the threshold could be set at seven so that any impact of seven or higher is escalated.

In some embodiments, the solution and/or problem station may be re-run through the system if the impact probability is unsatisfactory. In some implementations, there are two (2) thresholds and the middle range of impact scores may be re-run through the system.

As noted above, the implemented solution, its impact and the predictive solutions and expected impacts may be dynamically fed back to the AKB1. This provides for system learning and artificial intelligence application with regard to proposing solutions, modifying solutions and gauging their expected impacts.

When a solution is to be implemented, that means that the data migration project may proceed and data may be moved as defined by the parameters of the solution SL(x or y).

When a solution is escalated to a system administrator, it may be presented to the administrator on their personal screen or otherwise, and the administrator may then make a manual decision regarding proceeding with the data migration based on the impact probability.

Referring back to FIG. 1, the figure illustrates a network system environment 100, in which some embodiments of the invention operate. The environment 100 includes a user device 200 associated or used with authorization of a user 104, network system(s) 300, data migration system(s) 400, and data migration system(s) 500. As used herein, a "processing device," such as the processing devices 204, 304, 404, and 504, generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface," such as the user interfaces 206, 306, 406, and 506, generally includes a plurality of interface devices and/or software that allow a user to input commands and data to direct the processing device to execute instructions. For example, the user interface presented in FIG. 2 may include a graphical user interface (GUI) or an interface to input computer-executable instructions that direct the processing device to carry out specific functions. The user interface employs certain input and output devices to input data received from a user or output data to a user. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device," such as memory devices 208, 308, 408, and 508, generally refers to a device or combination of devices that store one or more forms of computer-readable media for storing data and/or computer-executable program code/instructions. Computer-readable media is defined in greater detail below. For example, in one embodiment, the memory device includes any computer memory that provides an actual or virtual space to temporarily or permanently store data and/or commands provided to the processing device when it carries out its functions described herein.

As used herein, a "communication interface," such as communication interfaces 202, 302, 402, and 502, generally includes a modem, server, transceiver, and/or other device for communicating with other devices on a network, and/or a user interface for communicating with one or more users. A communication interface may have one or more communication devices configured to communicate with one or more other devices on a network, such as a user device, computer system, server system, cloud server system, and/or the like. The processing device is configured to use the network communication interface to transmit and/or receive data and/or commands to and/or from the other devices connected to the network.

The systems and devices communicate with one another over the network 102 and perform one or more of the various steps and/or methods according to embodiments of the disclosure discussed herein. The network 102 may include a local area network (LAN), a wide area network (WAN), and/or a global area network (GAN). The network 102 may provide for wireline, wireless, or a combination of wireline and wireless communication between devices in the network. In one embodiment, the network 102 includes the Internet.

Referring now to FIG. 2, which schematically depicts a user device, in accordance with one embodiment of the invention, the user device 200 includes a communication interface 202 communicably coupled with a processing device 204, which is also communicably coupled with a memory device 208. In some embodiments, the communication interface 202 may also comprise a GPS transceiver capable of determining a geographic location associated with the user device 200. The processing device 204 is configured to control the communication interface 202 such that the user device 200 communicates across the network 102 with one or more other systems. The processing device 204 is also configured to access the memory device 208 in order to read the computer readable instructions 212, which in some embodiments includes a user application 114. The user application 114 allows for communication of the user device 200 with the other systems and devices within the environment 100 such as the network system(s) 300, the data migration system(s) 400, and the data migration system(s) 500. The user application 114 allows the user 104 to receive information transmitted as well as input information requested by the other systems and communicate with entities and third parties within the system environment 100. The memory device 208 also includes a data repository 210 or similar storage device for storing pieces of data that can be accessed by the processing device 706.

Referring now to FIG. 3, which schematically depicts an internal server system, in accordance with one embodiment of the invention, the internal server system 300 includes a communication interface 302 communicably coupled with a processing device 304, which is also communicably coupled with a memory device 308. The processing device 304 is configured to control the communication interface 302 such that the internal server system 300 communicates across the network 102 with one or more other systems. The processing device 304 is also configured to access the memory device 308 in order to read the computer readable instructions 314, which in some embodiments includes a network system application 316. The network system application 316 allows for the maintenance of one or more servers and data stored on the servers of the network system(s). The network system application 316 may also allow for communication with the other systems and devices within the environment 100 such as the user device 200, the data migration system(s) 400, and data migration system(s) 500. The memory device 308 also includes a data repository 310 or similar storage device for storing pieces of data that can be accessed by the processing device 304 such as database(s) 312 maintained by the network system(s). In some embodiments, the network system(s) are maintained in-house by a source entity.

In various embodiments, the database(s) 312 include or are the AKB1, AKB2 and/or AKB3 shown in FIG. 7. Database(s) 312 or AKB1/2/3 may also be referred to herein as a first database, second database and third database, respectively. In various embodiments, the network system(s) 300 are the same system and in other embodiments, the network system(s) 300 represents two or more systems that are networked with one another and/or with the other system(s) shown in FIG. 2.

Referring now to FIG. 4, which schematically depicts data migration system(s) 400, in accordance with embodiments of the invention, the data migration system(s) 400 include a processing device 404 operatively coupled to a communication interface 402 and a memory device 408. The processing device 404 is configured to control the communication interface 402 such that the data migration system(s) 400 communicates across the network 102 with one or more other systems. The processing device 404 is also configured to access the memory device 408 in order to read the computer readable instructions 412, which in some embodiments include a database migration application 414 and an adaptive decision engine 416. The database migration application 414 enables for the migration of storage stored in a data repository 410 of the data migration system 400 to another data repository such as data repository 510 as represented by the migrated data 512 stored on the data migration system 500. Whereas, the adaptive decision engine 416 enables for performing one or more of the process steps discussed herein such as those steps associated with the adaptive decision engine discussed with reference to FIG. 7. In some embodiments, either the data migration application 414 and/or the adaptive decision engine 416 may also allow for communication with the other systems and devices within the environment 100 such as the user device 200, the network system(s) 300, and data migration system(s) 500. The memory device 408 also includes a data repository 410 or similar storage device for storing pieces of data that can be accessed by the processing device 304. In some embodiments, the data migration system(s) 400 may be part of another system in the environment 100 such as the user device 200, the network system(s) system 300, and/or the data migration system(s) 500, and in various embodiments, the data migration system(s) 400 may be or include two or more systems networked together or through other systems discussed herein.

Referring now to FIG. 5, which schematically depicts data migration system(s) 500, in accordance with one embodiment of the invention, the data migration system(s) 500 include a communication interface 502 communicably coupled with a processing device 504, which is also communicably coupled with a memory device 508. The processing device 504 is configured to control the communication interface 502 such that the data migration system(s) 500 communicate across the network 102 with one or more other systems. The processing device 504 is also configured to access the memory device 508 in order to read the computer readable instructions 518, which in some embodiments includes supportive decision engine 520, supportive decision engine 522, and supportive decision engine 524. There may also be other applications to enable for the maintenance of one or more servers and data stored on the servers of the data migration system(s) 500. The three supportive decision engines each may enable certain functionality, such as performing one or more of the process steps discussed herein. Specifically, with reference to FIG. 7, supportive decision engine 520 may perform the functions described with reference to the SDE1, supportive decision engine 522 may perform the functions described with reference to the SDE2, and supportive decision engine 524 may perform the functions described with reference to the SDE3. Other applications may also enable communication with the other systems and devices within the environment 100 such as the user device 200, the network system(s) 300, and the data migration system(s) 400. The memory device 508 also includes a data repository 510 or similar storage device for storing pieces of data that can be accessed by the processing device 304 such as a migrated data 512 which may have been migrated according to embodiments of the invention.

In various embodiments, one, two or three of the supportive decision engines operate on the same machine or network of machines, and in other embodiments none of them operate on the same machine or network of machines. In various embodiments, one, two or three of the supportive decision engines function as subpart(s) to the adaptive decision engine and operate from the same system(s) as the adaptive decision engine. In various embodiments, the adaptive decision engine is a control center for the three supportive decision engines and sends control signals configured to cause the machines running the supportive decision engines to perform certain process steps, such as those described herein with reference to each of the supportive decision engines, respectively. In various embodiments, the data migration system(s) 400 and 500 are the same system(s) or machines, and in other embodiments they are different machines. In various embodiments, the data being migrated is not stored on the data migration system(s) 500 but a different system (not shown).

The user application 114, the network system application 316, the data migration application 414, the adaptive decision engine 416, the supportive decision engines 520, 522 and 524, are for instructing the processing devices on their respective systems to perform various steps of the methods discussed herein, and/or other steps and/or similar steps. In various embodiments, one or more of the various applications discussed are included in the computer readable instructions stored in a memory device of one or more systems or devices other than their respective systems and/or devices. For example, in some embodiments, the data migration application 414 may be stored and configured for being accessed by a processing device of the network system(s) 300 connected to the network 102. In various embodiments, the user application 114, the network system application 316, the data migration application 414, the adaptive decision engine 416, the supportive decision engines 520, 522 and 524 are stored and executed by different systems/devices. In some embodiments, the discussed applications may be similar and may be configured to communicate with one another. In some embodiments, the various applications may be considered to be working together as a singular application despite being stored and executed on different systems.

In various embodiments, one of the systems discussed above, such as the data migration system(s) 500, is more than one system and the various components of the system are not collocated, and in various embodiments, there are multiple components performing the functions indicated herein as a single device. For example, in one embodiment, multiple processing devices perform the functions of the processing device 504 of the data migration system(s) 500 described herein.

In various embodiments, the user device 200, the network system(s) 300, the data migration system(s) 400, the data migration system(s) 500 and/or other systems may perform all or part of a one or more method or process steps discussed above and/or other method steps in association with the method steps discussed above. Furthermore, some or all the systems/devices discussed herein, in association with other systems or without association with other systems, in association with steps being performed manually or without steps being performed manually, may perform one or more of the steps of one or more of the method discussed herein, or other methods, processes or steps discussed herein or not discussed herein.

Referring now to FIG. 8, a flowchart 800 illustrates a method for migrating data using dynamic feedback. The first step, as illustrated by block 810, is to record dynamic implementation feedback data from an output of an adaptive decision engine in a first database.

The next step, as represented by block 820, is to identify a first problem statement for data migration. The next step, represented by block 830, is to determine a first potential solution for data migration. The first potential solution may be based on the first problem statement. It may include identification of relevant systems and process steps to accomplish the data migration.

The next step, represented by block 840, is to determine a final solution based on the first potential solution. Finally, the next step is to determine whether to implement the final solution based on a calculated impact of the final solution, which is discussed in further detail below, as represented by block 850.

Referring now to FIG. 9, a flowchart 900 illustrates a method for migrating data using dynamic feedback. In some embodiments, steps 910, 920 and/or 930 may be sub-steps of process step 840, which is to determine a final solution based on the first potential solution, as discussed with reference to FIG. 8 above. The first step, as represented by block 910, is to access the dynamic implementation feedback data. This may be done by a first supportive decision engine (or SDE1) and using the first database (or AKB1). The next step, as represented by block 920 is to compare at least one characteristic of the first problem statement to the dynamic implementation feedback data. This may result in identifying at least one similar previous data migration project.

Next, as represented by block 930, the SDE1 populates the first potential solution with identification of at least one relevant system and/or at least one process step utilized in the at least one similar previous data migration project.

Referring now to FIG. 10, a flowchart 1000 illustrates a method for migrating data using dynamic feedback. First, as represented by block 1010, the system records dynamic system configuration data and third party tool data in a second database (or AKB2). Next, as represented by block 1020, the system determines whether to replace the first potential solution with a second potential solution. Steps 1030, 1040, 1050 and/or 1060 may be sub-steps of step 1020. In step 1030, the second supportive decision engine (or SDE2) uses AKB2 to access dynamic system configuration data and dynamic third party tool data. As represented by block 1040, the SDE2 determines whether implementation of the first potential solution would cause any changes to the networked computing environment 100 by using the various dynamic data. Then, as represented by block 1050, the SDE2 populates a second potential solution, thereby determining that the second potential solution is the final solution if it determines that the implementation of the first potential solution would cause environmental changes. The second potential solution may include, in various embodiments, identification of relevant systems and process steps for migrating the data identified in the problem statement. The second potential solution is generated to avoid the environmental changes identified by the SDE2 that would take place given implementation of the first proposed solution.

On the other hand, if the SDE2 determines that the first potential solution would not change the environment, then SDE2 determines or identifies the first potential solution as the final solution, as represented by block 1060.

Referring now to FIG. 11, a flowchart 1100 illustrates a method for migrating data using dynamic feedback. The first step, as represented by block 1110, is for a third supportive decision engine (or SDE3) to determine an impact (I) of implementation of the final solution. The impact may represent a probability that implementation of the solution received from SDE2 causes an error. Steps 1120, 1130 and/or 1140 may be sub-steps of step 1110. As represented by block 1120, the SDE3 accesses dynamic expert data, which may include data gathered from experts and/or vendors. This dynamic expert data may be stored in a third database (or AKB3). Next, as represented by block 1130, the SDE3 compares at least one characteristic of the final solution to the dynamic expert data. This may identify at least one similar previous solution such that the system may calculate the impact of implementing the final solution based on this information, as represented by block 1140.

Next, as represented by block 1150, the final solution and the impact are transmitted to the adaptive decision engine (or ADE), which compares the impact to a predetermined threshold as represented by block 1150. Then, as represented by block 1160, if the impact is greater than the threshold, the ADE escalates the final solution and the impact to an administrative system for further evaluation regarding whether to implement the final solution or not. If the impact is less than the threshold, the ADE may automatically implement the final solution. In other words, the ADE initiates the data migration based on the parameters included in the final solution, as represented by block 1170.

In order to provide dynamic feedback for future problem statements and solution development, the ADE outputs the dynamic implementation feedback data from an output of the ADE as represented by block 1180. The dynamic implementation feedback data may be or include data related to the implemented solution, circumstances surrounding the data migration project, such as or including the problem statement, and the results of the project, which may include feedback on whether any environment changes or errors were detected during or after the data migration project was completed. This data is recorded in the first database (or AKB1), as represented by block 1190, and can be accessed and used by the SDE1 as discussed elsewhere herein.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for migrating data within a networked computing environment using dynamic feedback, the system comprising: at least one memory device; at least one network communication interface connected to a network; and at least one processing device operatively coupled to the memory device and the network communication interface, wherein the processing device is configured to execute computer-readable program code to: record, in a first database, dynamic implementation feedback data from an output of an adaptive decision engine, the dynamic implementation feedback data comprising data representing experience and impact of previously completed data migration projects; identify a first problem statement for data migration, the first problem statement comprising identification of data requiring migration; determine, based at least in part on the first problem statement, a first potential solution for data migration, the first potential solution comprising identification of a plurality of relevant systems and a plurality of process steps for using the plurality of systems to accomplish the data migration, the determining comprising: accessing, by a first supportive decision engine and using the first database, the dynamic implementation feedback data; comparing at least one characteristic of the first problem statement to the dynamic implementation feedback data, thereby identifying at least one similar previous data migration project; and populating the first potential solution with identification of at least one relevant system and/or at least one process step utilized in the at least one similar previous data migration project; determine a final solution based on the first potential solution; and determine, based on a calculated impact of the final solution, whether to implement the final solution.

2. The system of claim 1, wherein the processing device is further configured to execute computer-readable program code to: determine whether to replace the first potential solution with a second potential solution, the determining comprising: accessing, by a second supportive decision engine, and using a second database comprising dynamic system configuration data and dynamic third party tool data, the dynamic system configuration data and the dynamic third party tool data; determining, using the dynamic system configuration data and dynamic third party tool data, whether implementation of the first potential solution would cause changes to the networked computing environment; if so, populating a second potential solution comprising identification of a plurality of relevant systems and a plurality of process steps for using the plurality of relevant systems to accomplish the data migration, thereby determining that the second potential solution is the final solution; and if not, determining that the first potential solution is the final solution.

3. The system of claim 2, wherein the processing device is further configured to execute computer-readable program code to:
record, in the second database, the dynamic system configuration data and dynamic third party tool data.

4. The system of claim 2, wherein the processing device is further configured to execute computer-readable program code to: determine an impact of implementation of the final solution, the determining comprising: accessing, by a third supportive decision engine and using a third database, dynamic expert data; comparing at least one characteristic of the final solution to the dynamic expert data, thereby identifying at least one similar previous solution; and calculating, based on a comparison, an impact of implementing the final solution.

5. The system of claim 4, wherein the processing device is further configured to execute computer-readable program code to:
compare, using the adaptive decision engine, the impact to a predetermined threshold; and
perform engine final processing of the final solution, the performing comprising:
if the impact is greater than the threshold, escalate the final solution and the impact to an administrative system for evaluation; and
if the impact is less than the threshold, automatically implement the final solution.

6. The system of claim 5, wherein processing device is further configured to execute computer-readable program code to:
output, by the adaptive decision engine and based on the performing engine final processing, the dynamic implementation feedback data from an output of an adaptive decision engine; and
wherein the recording the dynamic implementation feedback data from an output of an adaptive decision engine comprises receiving the dynamic implementation feedback data from an output of an adaptive decision engine at the first database.

7. The system of claim 1, wherein processing device is further configured to execute computer-readable program code to:
generate, by the adaptive decision engine, the first problem statement based on one or more system logs.

8. A computer program product for migrating data within a networked computing environment using dynamic feedback, the computer program product comprising at least one non-transitory computer readable medium having computer-readable program code portions embodied therein, the computer-readable program code portions comprising: an executable portion configured for recording, in a first database, dynamic implementation feedback data from an output of an adaptive decision engine, the dynamic implementation feedback data comprising data representing experience and impact of previously completed data migration projects; an executable portion configured for identifying a first problem statement for data migration, the first problem statement comprising identification of data requiring migration; an executable portion configured for determining, based at least in part on the first problem statement, a first potential solution for data migration, the first potential solution comprising identification of a plurality of relevant systems and a plurality of process steps for using the plurality of systems to accomplish the data migration, the determining comprising: an executable portion configured for accessing, by a first supportive decision engine and using the first database, the dynamic implementation feedback data; an executable portion configured for comparing at least one characteristic of the first problem statement to the dynamic implementation feedback data, thereby identifying at least one similar previous data migration project; and an executable portion configured for populating the first potential solution with identification of at least one relevant system and/or at least one process step utilized in the at least one similar previous data migration project; an executable portion configured for determining a final solution based on the first potential solution; and an executable portion configured for determining, based on a calculated impact of the final solution, whether to implement the final solution.

9. The computer program product of claim 8, wherein the computer-readable program code portions further comprise: an executable portion configured for determining whether to replace the first potential solution with a second potential solution, the determining comprising: accessing, by a second supportive decision engine, and using a second database comprising dynamic system configuration data and dynamic third party tool data, the dynamic system configuration data and the dynamic third party tool data; determining, using the dynamic system configuration data and dynamic third party tool data, whether implementation of the first potential solution would cause changes to the networked computing environment; if so, populating a second potential solution comprising identification of a plurality of relevant systems and a plurality of process steps for using the plurality of relevant systems to accomplish the data migration, thereby determining that the second potential solution is the final solution; and if not, determining that the first potential solution is the final solution.

10. The computer program product of claim 9, wherein the computer-readable program code portions further comprise:
an executable portion configured for recording, in the second database, the dynamic system configuration data and dynamic third party tool data.

11. The computer program product of claim 9, wherein the computer-readable program code portions further comprise:

an executable portion configured for determining an impact of implementation of the final solution, the determining comprising: accessing, by a third supportive decision engine and using a third database, dynamic expert data; comparing at least one characteristic of the final solution to the dynamic expert data, thereby identifying at least one similar previous solution; and calculating, based on a comparison, an impact of implementing the final solution.

12. The computer program product of claim 11, wherein the computer-readable program code portions further comprise:
an executable portion configured for comparing, using the adaptive decision engine, the impact to a predetermined threshold; and
an executable portion configured for performing engine final processing of the final solution, the performing comprising:
if the impact is greater than the threshold, escalate the final solution and the impact to an administrative system for evaluation; and
if the impact is less than the threshold, automatically implement the final solution.

13. The computer program product of claim 12, wherein the computer-readable program code portions further comprise:
an executable portion configured for outputting, by the adaptive decision engine and based on the performing engine final processing, the dynamic implementation feedback data from an output of an adaptive decision engine; and
wherein the recording the dynamic implementation feedback data from an output of an adaptive decision engine comprises receiving the dynamic implementation feedback data from an output of an adaptive decision engine at the first database.

14. The computer program product of claim 8, wherein the computer-readable program code portions further comprise:
an executable portion configured for generating, by the adaptive decision engine, the first problem statement based on one or more system logs.

15. A computer implemented method for migrating data within a networked computing environment using dynamic feedback, the computer implemented method comprising: recording, in a first database, dynamic implementation feedback data from an output of an adaptive decision engine, the dynamic implementation feedback data comprising data representing experience and impact of previously completed data migration projects; identifying a first problem statement for data migration, the first problem statement comprising identification of data requiring migration; determining, based at least in part on the first problem statement, a first potential solution for data migration, the first potential solution comprising identification of a plurality of relevant systems and a plurality of process steps for using the plurality of systems to accomplish the data migration, the determining comprising: accessing, by a first supportive decision engine and using the first database, the dynamic implementation feedback data; comparing at least one characteristic of the first problem statement to the dynamic implementation feedback data, thereby identifying at least one similar previous data migration project; and populating the first potential solution with identification of at least one relevant system and/or at least one process step utilized in the at least one similar previous data migration project; determining a final solution based on the first potential solution; and determining, based on a calculated impact of the final solution, whether to implement the final solution.

16. The computer-implemented method of claim 15, further comprising: determining whether to replace the first potential solution with a second potential solution, the determining comprising: accessing, by a second supportive decision engine, and using a second database comprising dynamic system configuration data and dynamic third party tool data, the dynamic system configuration data and the dynamic third party tool data; determining, using the dynamic system configuration data and dynamic third party tool data, whether implementation of the first potential solution would cause changes to the networked computing environment; if so, populating a second potential solution comprising identification of a plurality of relevant systems and a plurality of process steps for using the plurality of relevant systems to accomplish the data migration, thereby determining that the second potential solution is the final solution; and if not, determining that the first potential solution is the final solution.

17. The computer-implemented method of claim 16, further comprising:
recording, in the second database, the dynamic system configuration data and dynamic third party tool data.

18. The computer-implemented method of claim 15, further comprising: determining an impact of implementation of the final solution, the determining comprising: accessing, by a third supportive decision engine and using a third database, dynamic expert data; comparing at least one characteristic of the final solution to the dynamic expert data, thereby identifying at least one similar previous solution; and calculating, based on a comparison, an impact of implementing the final solution.

19. The computer-implemented method of claim 18, further comprising:
comparing, using the adaptive decision engine, the impact to a predetermined threshold; and
performing engine final processing of the final solution, the performing comprising:
if the impact is greater than the threshold, escalate the final solution and the impact to an administrative system for evaluation; and
if the impact is less than the threshold, automatically implement the final solution.

20. The computer-implemented method of claim 19, further comprising:
outputting, by the adaptive decision engine and based on the performing engine final processing, the dynamic implementation feedback data from an output of an adaptive decision engine; and
wherein the recording the dynamic implementation feedback data from an output of an adaptive decision engine comprises receiving the dynamic implementation feedback data from an output of an adaptive decision engine at the first database.

* * * * *